March 18, 1958     A. LENNING     2,827,271
CARBURETOR OF THE FUEL INJECTION TYPE
Filed Oct. 22, 1954     2 Sheets-Sheet 1
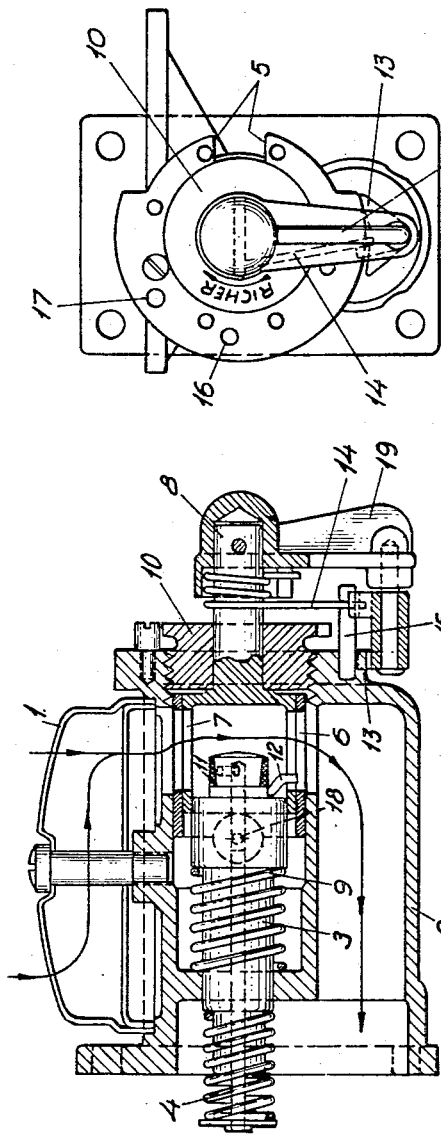
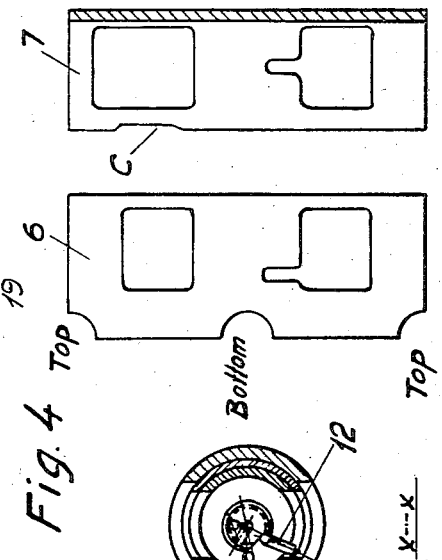
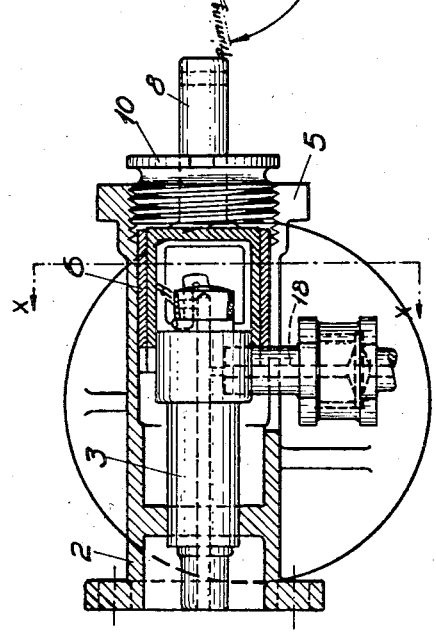
Alvar Lenning
By Darby & Darby
ATTORNEYS March 18, 1958  A. LENNING  2,827,271
CARBURETOR OF THE FUEL INJECTION TYPE Filed Oct. 22, 1954  2 Sheets-Sheet 2

INVENTOR.
ALVAR LENNING
BY Darby & Darby
ATTORNEYS

United States Patent Office 2,827,271
Patented Mar. 18, 1958

2,827,271

CARBURETOR OF THE FUEL INJECTION TYPE

Alver Lenning, Stockholm, Sweden, assignor to Aktiebolaget Keba, Stockholm, Sweden Application October 22, 1954, Serial No. 464,145

Claims priority, application Sweden March 29, 1954

4 Claims. (Cl. 261—37)

My invention has for its object an injection type carburetor primarily to be used with 2-cycle single cylinder combustion engines employing volatile fuel. The new carburetor may be looked upon as a further development of the carburetor described in U. S. Patent No. 2,694,386 issued November 16, 1954.

The general aid of the invention is essentially the same as in the previous patent, i. e. the new device is to serve the purpose of improving the performance of small sized 2-cycle combustion engines. In such engines the quantity of fuel to be dissipated into the intake air at each power stroke is comparatively small, at full load being of the magnitude of 5 cubic millimeters when the cylinder volume amounts to 50 cubic centimeters. When idling the engine will require less than half of said quantity. The problem of obtaining dependable operation at such small injection volumes involves a rather high degree of precision in producing the pump sleeve, the pump piston and in the attendant valve functions. Such precision work tends to make the manufacturing costs high. In choosing a proper design, and the proper material for same, one also has to consider the influence of wear. These considerations lead to the conclusion that the pump should have only a minimum number of moving parts and that the piston diameter should be small in relation to the pump stroke. Furthermore the volume of liquid to be injected into the air intake at each stroke should be manually variable to suit different fuels, changes in air and engine temperatures and to compensate for mechanical wear in the pump.

Additionally the device should produce an effective pump stroke which automatically follows the position of the air intake throttle in accordance with a curve to be determined experimentally once and for all. It should also incorporate a tightly closing automatic valve to prevent fuel from a pressure fuel tank from leaking into the engine, or from going to waste when the engine is at a standstill. Around these requirements the new injection device has been designed.

The invention is described hereinafter in conjunction with the accompanying drawings in which, Fig. 1 is a cross sectional view taken horizontally through the carburetor, here shown in its normal position on the engine crank case;

Fig. 2 is a corresponding vertical cross section;

Fig. 3 is a cross section taken at x—x in Fig. 2;

Fig. 4 is an exterior end view;

Figs. 5a and 5b are developments of cylindrical throttle members incorporated in the device, and the same reference numbers are used throughout.

Figure 6:
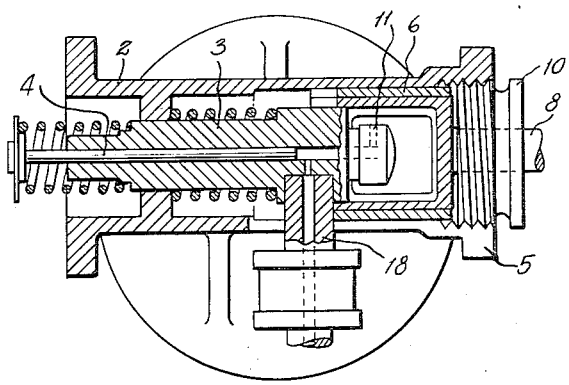
Fig. 6 is a vertical cross sectional view similar to Fig. 2 but showing the pump sleeve in section.

In Fig. 1 numeral 1 represents a perforated air filter cap which is mounted on one side of a pump body 2. The pump body is transversed by two a step cylindrical bore to accommodate an axially slidable pump sleeve 3, having a central piston 4. The pump sleeve is provided with a supply tube 18 for the fuel (an oil-gasoline mixture) and is to be assembled into the pump body from the right, the tube 18 fitting into a slot 5 (Fig. 2) in the pump body. The right end of the pump sleeve 3 is kept in alignment with the bore by means of a stationary sleeve 6 surrounding a movable throttle sleeve 7, these two sleeves constituting a pair of throttling members. Throttling action is effected by turning sleeve 7 through a desired angle, causing the apertures in sleeves 6 and 7 (see Figs. 5a and 5b) to co-operate in cutting off, or admitting, intake air, the path of which is indicated by the air stream lines in Fig. 1.

The pump sleeve 3 is continuously pressed towards the right by means of a helical spring 9, the spring pressure being transmitted by the fuel tube 18 and the throttle member 7 to a setting member 10 which is screwed into the pump body from the right. This setting member has a central aperture to accommodate a shaft extension 8 from the throttling member 7.

The pump sleeve 3 has no inlet non-return or check valve since the piston 4 (see Fig. 6), on its pump stroke, cuts off the inlet aperture after a short distance of travel. There is, on the other hand, an outlet check valve, here shown as a cylindrical, resilient rubber sleeve 11 which normally closes off a radially disposed outlet aperture 20 (Fig. 6) for the fuel. This rubber sleeve may, for the purpose of priming, be stretched away from said aperture by means of a wire member 12 (more clearly shown in Fig. 3) which engages with the throttle sleeve 7 when the latter is turned through an angle beyond its normal idling position.

The extension shaft 8, which is for governing the engine, is equipped with a handle 19. This handle carries a friction member 13 which by means of a wire spring 14 is kept pressed against the circumference of an adjacent cylindrical portion of the pump housing, and is intended for producing enough friction to prevent accidental change of the setting of handle 19. This wire spring also serves the purpose of cooperating with the stop pin 15 for the full load position of the handle 19, and with the stop pin 16 for the idling position. The idling stop is, however, not a fixed one since the arrangement of the spring 14 is such as to permit a continuation of the handle movement beyond the idling point, against the spring force, this movement being for priming as already described.

The apparatus operates in the following manner. At the full load position, corresponding to Figs. 1, 2, 3, and 4 the intake air will intermittently be drawn into the cylinder (not shown) along the air stream lines in Fig. 1. Synchronously, and preferably in phase, with the air pulses, fuel will be injected into the intake air as this is moving past the spray nozzle formed by the rubber sleeve 11 in conjunction with the fuel aperture covered by said sleeve. The pump piston 4 is to be actuated by a cam or the like (not shown) on, or mechanically connected with, the engine shaft.

The quantity of fuel which is injected into the intake air at each pump stroke is determined by that part of the piston stroke which takes place beyond (i. e. to the right of) the inlet opening from the tube 18. Said part, or phase, of the pump stroke may be termed "the effective pump stroke." It should be obvious that the effective pump stroke increases as the pump sleeve is moved towards the left, say by screwing the setting member 10 inwardly, provided the total pump stroke so permits.

In case no other means of regulation were to be provided the effective pump stroke would be constant for each setting of the member 10, and would thus be independent of the air throttling. This is undesirable since the air-gas mixture would then be too rich, when the engine is set to idle, i. e. when the density of the intake air is substantially reduced. To compensate for the reduction and to produce the proper mixture at all throttle settings the throttling member 7 is equipped with a governing cam curve (at C in Fig. 5b) causing the pump sleeve to move slightly towards the right when turning the handle 19 to its idling position, thus effecting the required decrease in the effective pump stroke when the engine is to idle. By disposing said cam curve on the throttling member proper an important simplification of the apparatus is effected. This feature also facilitates the readjustment of a worn pump to produce full engine performance, by the simple expedient of reworking the curve to any desired shape, say by means of a file. Usually a worn pump requires a reduction in the decrease of the pump stroke at the idling position, owing to the larger fuel leakage past the piston attendant to a worn pump. It should thus be apparent that the new carburetor comprises two independent means for governing the effective pump stroke, one in the shape of the setting member 10 by which, say, the full load effective pump stroke is to be set; the other means being the governing curve C by which the correct reduction of the pump stroke, as required for part loads, or idling, is effected.

Within the scope of the inventional idea the injection device now having been described may be varied in several ways. The throttling sleeve 7 may e. g. be provided with an eccentric rather than with a cam curve as shown in Fig. 5b, to serve the same purpose. In that case the axis of the throttling member should preferably be at right angles with that of the pump sleeve.

I claim:

1. An injection type carburetor particularly for 2-cycle combustion engines, comprising, in combination, a pump housing, a pump sleeve mounted in said housing, a piston having a constant stroke, means mounting said piston in said pump sleeve, a manually operable air throttle valve, and means on said air throttle valve for adjusting the position of said pump sleeve to vary the effective stroke of said pump piston.

2. An injection type carburetor particularly for 2-cycle combustion engines, comprising, in combination, a pump housing, a cylindrical bore in said housing, a pump sleeve mounted in said bore and axially adjustable, a piston mounted in said pump sleeve, said piston having a constant stroke, the effective portion of said stroke being adjustable by axial adjustment of said pump sleeve, a manually rotatable cylindrical air supply sleeve, and a cam on one edge of said sleeve cooperating with said pump sleeve for adjusting the position of said pump sleeve in response to changes in the throttle setting.

3. An injection type carburetor particularly for 2-cycle combustion engines, comprising, in combination, a pump housing having a cylindrical bore therein, an air throttle sleeve mounted in said bore, a cooperating air throttle sleeve mounted within said first sleeve, said air throttling sleeves having apertures therein, said inner sleeve being rotatable with respect to said outer sleeve to throttle the air supply, a pump sleeve mounted within said inner air throttling sleeve and axially displaceable with respect thereto, a piston mounted in a bore in said pump sleeve, a fuel passage communicating with said bore, manually operable means for adjusting the position of said pump sleeve axially of said pump housing and relative to said pump piston whereby said piston's effective stroke may be adjusted while its total stroke remains constant, and means on said inner air throttling sleeve for adjusting the axial position of said pump sleeve to decrease the effective stroke when said inner throttling member is rotated to a position corresponding to idling of the engine.

4. An injection type carburetor particularly for 2-cycle combustion engines, comprising, in combination, a pump housing comprising a generally cylindrical bore, a stationary air throttling sleeve mounted in said bore, a rotatable air throttling sleeve cooperating with said stationary sleeve to regulate the air supply to the engine, said sleeves having substantially diametrically spaced apertures therethrough, the position of said apertures being adjustable with respect to one another, means carried on said inner air throttling sleeve for rotating said sleeve with respect to said stationary sleeve, a pump sleeve mounted in said inner throttling sleeve, a fuel supply pipe mounted at substantially right angles to said pump sleeve and extending through an opening in said pump housing, an axial bore in said pump sleeve, said bore communicating with said fuel supply pipe, spring means pressing said pump sleeve and fuel supply pipe in one direction, said pipe bearing against said inner throttling valve, manually operable means for pressing said inner throttling sleeve, fuel supply pipe and pump sleeve in the opposite direction, a piston mounted in said bore in said pump sleeve, an outlet from said bore extending radially of said pump sleeve and communicating with the air passage within said inner throttling cylinder, and means carried by said inner throttling cylinder and operable upon rotation thereof to idling position to permit said spring to move said pump sleeve to a position to decrease its effective stroke to thereby adjust the fuel supply relative to the air supply to permit proper idling of the engine.

References Cited in the file of this patent

UNITED STATES PATENTS

| | | |
|---|---|---|
| 1,881,860 | Muzzy | Oct. 11, 1932 |
| 2,008,143 | Mock | July 16, 1935 |
| 2,126,092 | Corydon et al. | Aug. 9, 1938 |
| 2,239,884 | Deeley | Apr. 29, 1941 |
| 2,406,115 | Stephan | Aug. 20, 1946 |
| 2,612,884 | Reggio | Oct. 7, 1952 |

UNITED STATES PATENT OFFICE

CERTIFICATE OF CORRECTION

Patent No. 2,827,271                                    March 18, 1958

Alvar Lenning

It is hereby certified that error appears in the above numbered patent requiring correction and that the said Letters Patent should read as corrected below.

In the grant, line 1, and in the heading to the printed specification, line 3, name of inventor, for "Alver Lenning" read -- Alva Lenning --.

Signed and sealed this 6th day of May 1958.

(SEAL)

Attest:

KARL H. AXLINE
Attesting Officer

ROBERT C. WATSON
Commissioner of Patents